June 16, 1931.  H. A. DENMIRE  1,810,072
PNEUMATIC TIRE AND METHOD OF AND APPARATUS FOR BUILDING THE SAME
Filed Oct. 4, 1926  3 Sheets-Sheet 1

INVENTOR
Harald A. Denmire
BY Evans & McCoy
ATTORNEYS

INVENTOR
Harold A. Denmire
BY Evans & [Attorneys signature]
ATTORNEYS

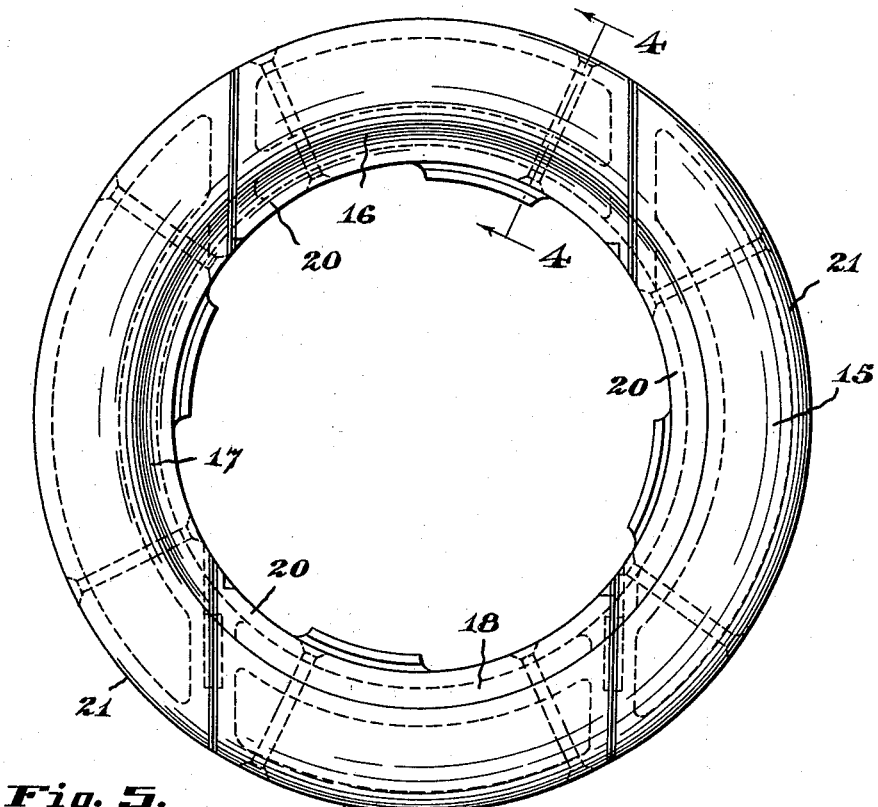
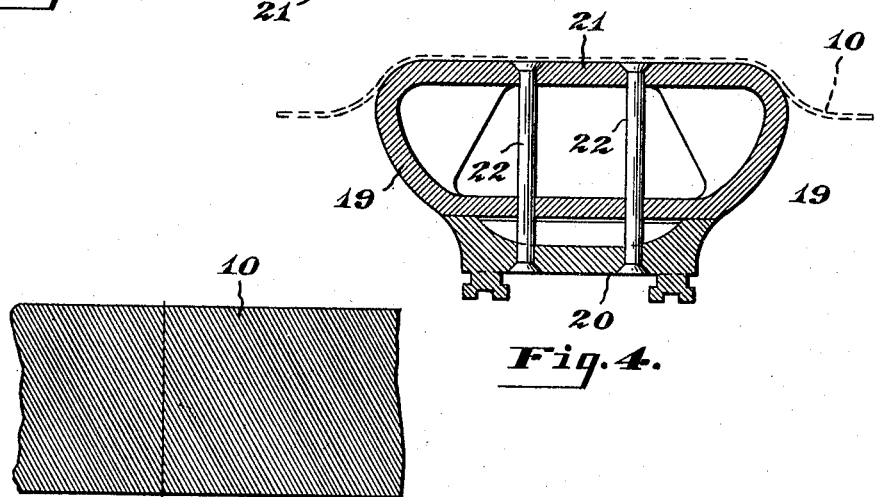
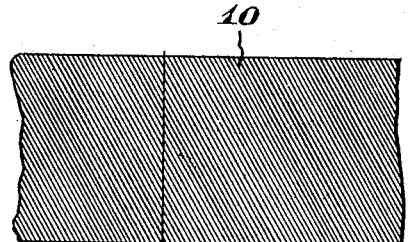

Patented June 16, 1931

1,810,072

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

PNEUMATIC TIRE AND METHOD OF AND APPARATUS FOR BUILDING THE SAME

Application filed October 4, 1926. Serial No. 139,486.

This invention relates to pneumatic tires for vehicles and the like and it particularly relates to a method of and apparatus for constructing pneumatic tire casings.

With the conventional adoption of so-called balloon or low pressure tires, considerable difficulty has been experienced in the building of tires of larger sizes and also in building tires of relatively large cross sectional size and small diameter by reason of the difficulty of providing suitable collapsible cores for such tires and also because of the necessity of consolidating a greatly increased length of fabric per unit of length in the beads of the tire in building up the same. The primary cause of this is the very large proportionate difference between the outer and inner circumferences of the tires.

In the conventional manufacture of pneumatic tires it is necessary to first place a band of fabric around the tire core and then stitch the fabric down the side walls of the core and around the bead. The quantity of fabric that it is necessary to consolidate into a unit distance along the bead increases greatly with increase of external diameter of core relative to the diameter of the bead zone. This great excess of fabric cannot be consolidated into a smooth layer at the zone of the bead by the conventional operation of the stitchers in the larger sizes of balloon tires and it invariably results in a series of puckers or folds that are formed in the bead zone of the tire carcass. On the other hand, if the bands of cord fabric that are used in making up the tire carcass are cut sufficiently short to embody only the proper number of cord elements that can be consolidated into a unit distance along the tire bead to thus form a single smooth layer of material at the bead of the tire, then the band so formed cannot be stretched over the crown or radially outer portion of the core without considerable difficulty and with objectionable irregularities in the angle of the cord.

Another difficulty that has caused considerable trouble in the manufacture of balloon tires of the larger sizes has been the inability to provide a suitable collapsible core for building such tires. The very small internal diameter and relatively large external diameter of the larger sizes of cores for balloon tires precludes the building of a collapsible core having the finished form of the tire because the core sections cannot be collapsed to a position sufficiently reduced in diameter to materially assist in the handling of the tire carcass.

In order to overcome the above objectionable features of balloon tire construction, I have herein proposed the building of a tire carcass in such form that the bead portions of the carcass are widely separated and respectively formed of normal curvature although the crown of the unvulcanized tire casing is flattened to greatly reduce the external diameter of the tire without material distortion of the reinforced bead zones. The side walls of the tire carcass from the beads preferably to a point well above the termination of the breaker strips, or other side wall reinforcing elements, which is generally from one-third to one-half the radial extent of the side wall, are built to substantially the curvature and form that will be given those parts in the finished tire carcass. The crown of the tire carcass, or, in other words, the radially outer portion thereof is flattened preferably from somewhat above the termination of the side wall reinforcing elements across its entire face in order that the maximum diameter of the core will be greatly reduced although the cross sectional perimeter of the tire carcass in its formed condition will remain substantially the same as in former practice.

In a tire carcass of the character proposed, the bands of cord fabric that are used in making up the tire are cut at materially less angularity of bias than bands used in building tire carcasses of normal shape. The cord elements over the body of the carcass change in angularity with the shaping of the carcass to provide intersecting cord elements that preferably extend at substantially 90° to each other in the tread zone in the finished tire although any other desired angularity can be obtained by changing the initial angularity of the fabric.

One of the objects of the invention is to provide a collapsible core for use in the manufacture of tires of relatively large proportion of cross sectional area to internal diameter.

Another object of the invention is to provide a method of building tires of relatively large proportional cross sectional area wherein the plies of cord fabric making up the tire carcass are formed into relatively smooth layers at the bead of the tire.

An additional object of the invention is to provide a method of building tires wherein the cord elements of the tire carcass can be initially mounted on the carcass at materially less angularity relative to the radius of the tire than has heretofore been done and in which the cord elements traversing the tread portion of the tire are arranged at the most effective or desirable angle.

A further object of the invention is to provide a method of building tires that will facilitate consolidating the cord fabric at the bead.

In order to more clearly illustrate the subject matter of this invention reference is had to the accompanying drawings wherein:

Fig. 4 is a detail cross sectional view of the tire building core taken on line 4—4 of Fig. 5.

Fig. 5 is a detail side elevational view of the tire building core shown in other views as mounted on the tire building machine.

Fig. 6 is a plan view of a portion of a cord fabric band employed in conjunction with the core in the building of a tire carcass on the machine herein described.

Figure 1:
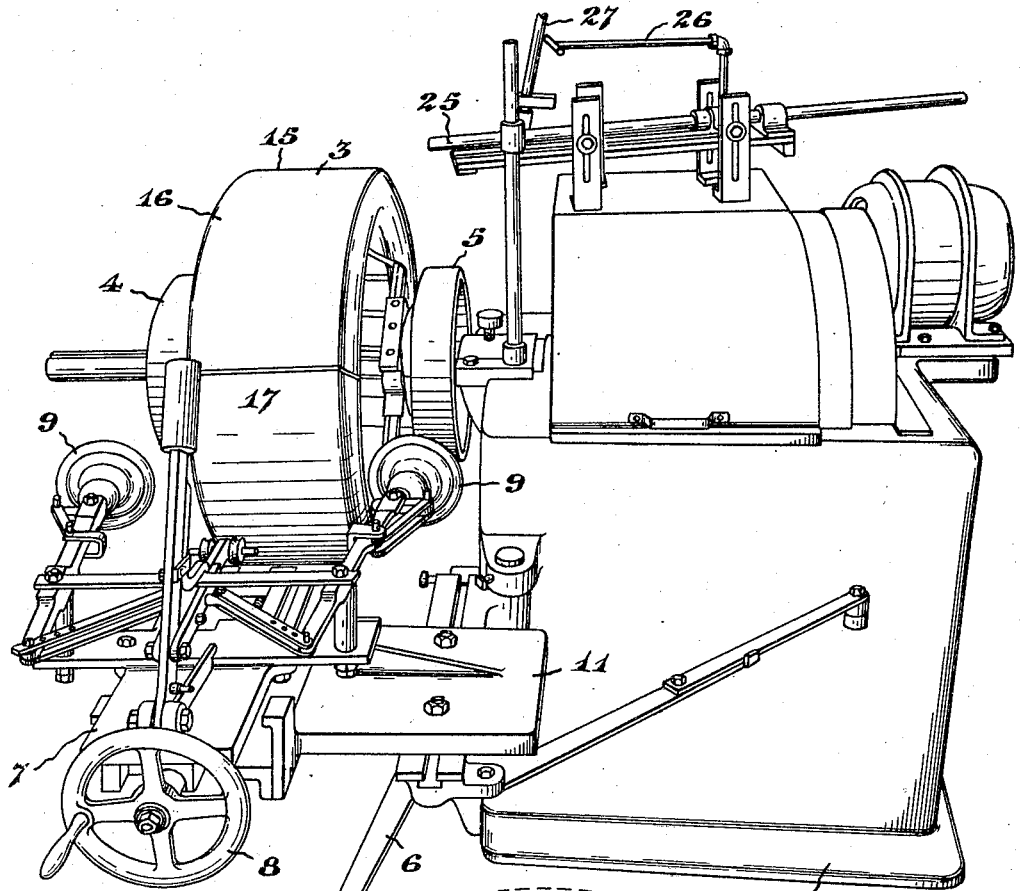
Figure 1 is a view in perspective of a tire building machine having a collapsible core of the character herein proposed mounted thereon.

The tire building machine shown in the accompanying drawings comprises a supporting standard 1 on which collapsible core supporting mechanism 2 is mounted for carrying the respective sections of a core 3. Hand wheels 4 and 5 are provided for actuating the core supporting mechanism. The core mechanism is adapted to be operated at any desired speed by operation of foot control mechanism 6. A stitcher carriage 7 that is actuated toward and away from the core by a hand wheel 8 carries a pair of stitchers 9 that are adapted to draw bands of cord fabric 10 down over the core to shape the tire carcass therefrom. The stitcher carriage is mounted on a swingable support 11 that is pivotally carried by the standard 1 and adapted to be swung into and out of operative position.

Although tires may be built in accordance with this invention on either endless or multiple part core members, the heretofore unobtainable advantages of a collapsible core for relatively large sizes of balloon tires may readily be obtained by using a core of the character herein proposed and mounting the sectional parts on any suitable collapsible core supporting mechanism. A preferred form of core supporting mechanism is shown in my issued Patents 1,421,418, granted July 4, 1922 and 1,454,995, granted May 15, 1923.

Figure 7:
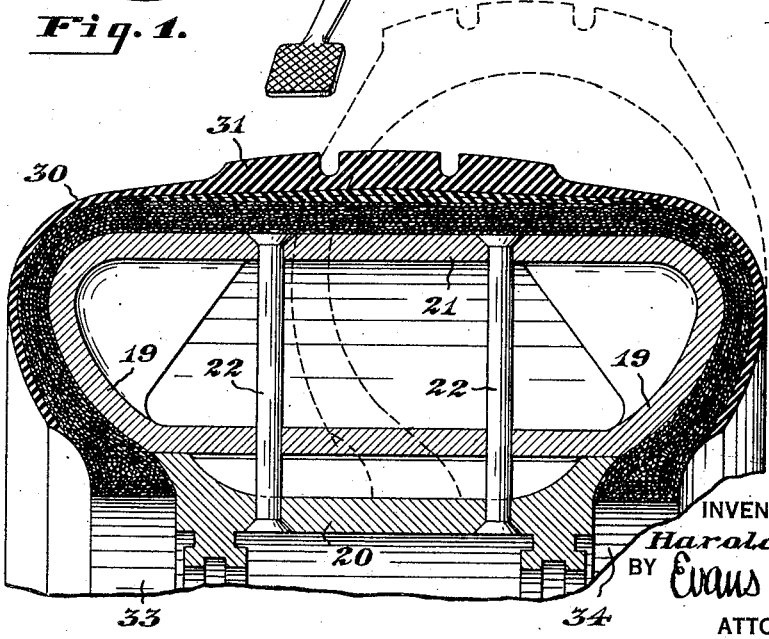
Fig. 7 is an enlarged cross sectional view of the core with a tire built thereon and showing in dotted outline the shape subsequently given the tire in its vulcanization.
Figure 2:
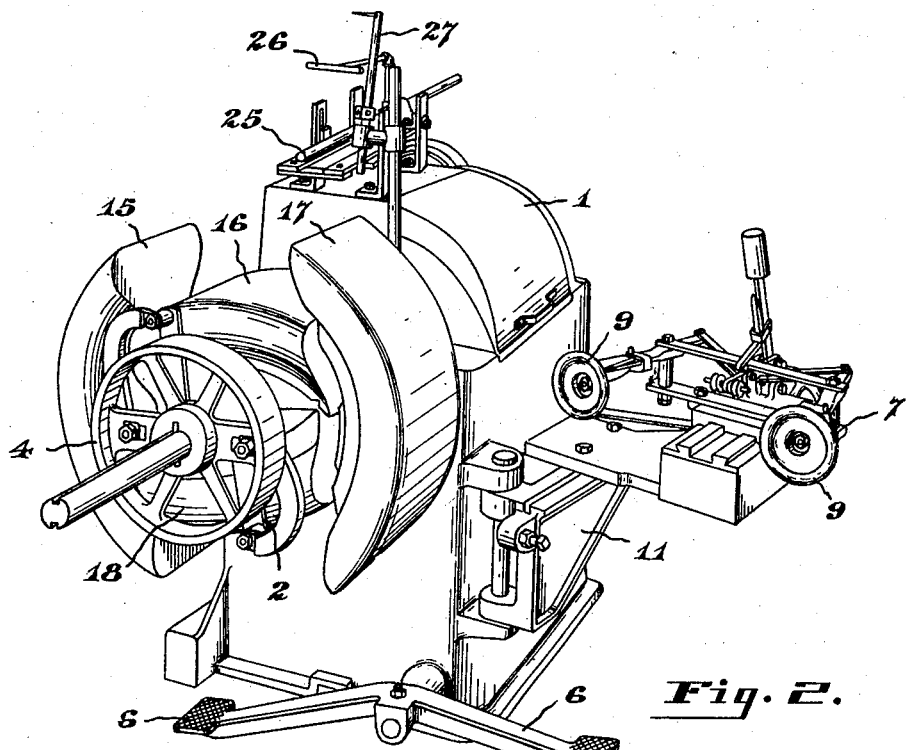
Fig. 2 is a view in perspective of the machine shown in Fig. 1 with the core thereof partially collapsed.
Figure 3:
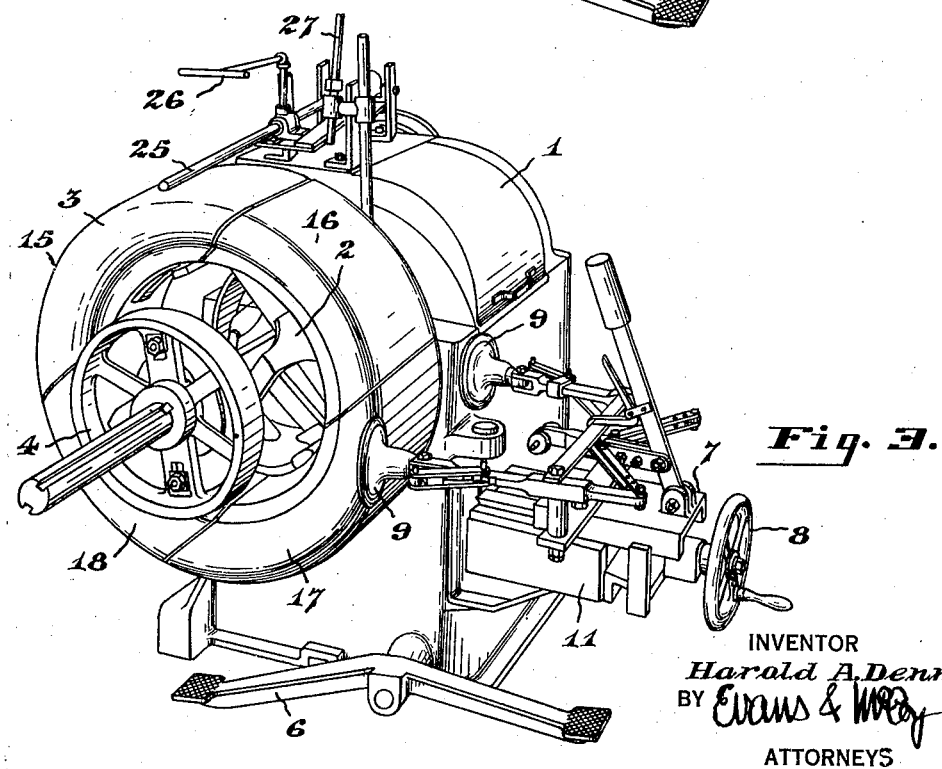
Fig. 3 is a view in perspective of the machine shown in Fig. 1 with the parts thereof in position for the building of a tire carcass thereon.

The core that is shown as illustrative of my invention comprises a plurality of collapsible sections 15, 16, 17 and 18 that are carried by the collapsible supporting mechanism 2. The general cross sectional form of the core is shown in Fig. 4 and Fig. 7. The side wall portions 19 are substantially the shape of the completed tire carcass from a central zone of the side wall of the casing to the bead of the tire. The portion of the core upon which the portion of the tire casing radially beyond the central zone of the side wall is formed has the crown substantially flattened and sufficiently wide to provide a tire casing of the proper dimension when it is changed from its flattened tread form to the finished form in the molding and curing thereof.

In general the normal contour of the core is carried radially outward to a zone beyond the reinforced bead zone of the casing. This avoids changing the initial shape of the tire carcass in the reinforced bead zones during the vulcanization and molding of the casing. The secure anchorage of the cord elements at the beads and the thicker reinforced portions of the tire casing are undisturbed as to physical contour during the curing and shaping of the casing. On the other hand, the body of the tire carcass is readily deformable or moldable into desired cross sectional contour after it is built. The physical lengthening of the tread portions of the casing changes the angularity of the cord elements from the initial transverse angularity preferably of about 30° to the desired angularity of about 45° although any other angularity may readily be obtained by changing the initial angularity of the bias cut cord fabric from which the casing is formed. Fig. 6 shows a specimen of fabric strip that is cut at substantially 30° bias for use in the manufacture of tires in accordance with the proposed method.

The initial low radial angularity of the cord elements in the bead zones of the casing enable a materially greater number of adjacent cords to be consolidated into a single smooth layer at the bead than is possible when the angularity of the cord elements is materially greater as is now the customary practice in the building.

For convenience of manufacture, the core is formed of an inner shell 20 of cast iron, or other desired material, and an outer shell 21 that is riveted to the inner supporting shell by a plurality of securing rivets 22 that serve to hold these parts rigidly together. The outer shell portion 21 is preferably formed of aluminum but any other suitable material could be used.

In the building of a tire carcass, the diameter of the fabric band, such for instance as that shown in Fig. 6, is preferably although not necessarily determined by the number of cords that can conveniently be compressed into the space of the zone of the bead by the conventional form of stitcher disc. The fabric is formed into an endless band which is stretched over the crown of the core by a suitable band applying roll 25 that is slid forward into operative position by a handle 26. The roll is pivotally mounted and arranged at an angle to the axis of rotation of the core in order to facilitate the application of the band to the core. A marker 27 that is swung about its pivot to operative position overlying the applied band of fabric has an index pointer that indicates when the scribed center of the band is in the median plane.

After application of the band to the core, the applying roll 25 and the index pointer are pushed back out of the way of the operator. The tread portion and side wall portion of the carcass are then stitched down in accordance with conventional practice. However, because of the flat crown of the core, very little if any stitching of the tread portion of the carcass is necessary. The relatively shallow side walls of the carcass and the short travel of the stitcher discs greatly facilitate the building of the tire carcass.

Several layers of fabric are thus applied until the proper thickness of carcass is obtained. The bead units and the reinforcing elements in the bead zones of the carcass are applied in any desired conventional manner.

After the tire carcass 30 is completed a tread band 31 that is thickest at its central zone and that tapers toward its edge portions is mounted on the tire carcass. This again is a much simpler operation with the flat faced core. It is unnecessary to stretch the tread when thus mounted on the tire carcass to the same degree as was heretofore found desirable in the conventional form of tire. The increased thickness of rubber in the center of the tread compensates for the stretching of the rubber both laterally and circumferentially in the subsequent molding and curing of the tire casing.

After the tire casing is finally built up with its tread mounted in place, it is placed in a suitable vulcanizing mold (not shown) and brought to the form shown in dotted outline in Fig. 7 by the conventional use of internal air bags or other expanding media. The wide separation of the bead portions 33 and 34 render the tire very accessible for the insertion of an air bag. The inflation of the air bag inside the tire carcass expands the crown or tread portion of the carcass into the mold cavity or this can be mechanically performed by any other suitable means. The tire carcass is then placed in a mold and cured to the conventional form for tires of this general character while heated under molding pressure.

An additional important feature of the invention is the provision of a finished tire casing in which the fabric of the tire carcass is consolidated into single uniform layers of material over the entire bead zone instead of being puckered and crowded as in conventional manufacture. The degree of stretching necessary to accomplish this result in tires of conventional size and form generally causes great difficulty in the application of the cord fabric bands to the core and, therefore, it cannot satisfactorily be used in the commercial manufacture of tires of conventional design. If a core of the general character herein proposed is used, the number of cords of the chosen radial angularity that can satisfactorily be consolidated into each unit length of bead portion of the tire can be determined from experiment. It is then a simple matter to calculate the length of bias cut fabric that is to be used in making up the bands for building tires of this character.

Another feature of the invention of particular importance is the ease of stretching the fabric band of the proposed character over a carcass because of the smooth and uniform character of the application. The band preferably has the same number of transverse cords as in bands of greater angularity but the length of the band is reduced by the reduced angularity of bias until the percentage of stretch required is the desired degree.

The practice of this invention also results in the use of materially shorter lengths of fabric in the formation of the bands and in a material economy of fabric. Short bands of this character cannot be stitched over the beads on the conventional form of mold without the development of an objectionable degree of wrinkling at the bead.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of building a pneumatic tire casing that consists in building up the carcass with a flattened crown of materially reduced external diameter and with side walls in the reinforced zone of the bead of substantially normal size and shape, and subsequently placing the tire carcass in a mold and bringing the carcass to normal form by materially increasing the diameter of the crown portion of the carcass.

2. The method of building a pneumatic tire casing that consists in building the tire carcass with its radially outer half laterally flattened to provide a relatively wide carcass with normal shaped side walls over the reinforced bead zones, and subsequently shaping and vulcanizing the carcass in cross sectionally rounded form.

3. The method of building a pneumatic tire that consists in building a carcass with its side walls in the reinforced bead zones normally shaped and the intermediate portion of the carcass flattened and having its cord elements disposed at a materially greater angle relative to the median plane of the tire than in the finished tire, expanding and shaping to normal the said intermediate portion of the carcass without materially changing the shape of the side walls of the carcass in the bead zones, and vulcanizing the tire casing in its normal shape.

4. The method of building a pneumatic tire that consists in building a carcass with its side walls in the reinforced bead zones normally shaped and the intermediate portion of the carcass flattened and having its cord elements disposed at a materially greater angle relative to the median plane of the tire than in the finished tire, mounting a tread band on the tire carcass of materially thickened central zone, expanding and shaping to normal the said intermediate portion of the carcass without materially changing the shape of the side walls of the carcass in the bead zones to materially change the angularity of the cords traversing the tread zone of the carcass, and vulcanizing the tire casing in its normal shape.

5. The method of building pneumatic tires that consists in forming the fabric plies of the carcass on a core having a flattened outer surface and widely spaced bead portions of more than one third the radial width of the finished tire casing, expanding the portions of the carcass intermediate the normal shaped bead zones to shape the carcass, and vulcanizing said carcass in its expanded condition.

6. The method of building a tire carcass that consists in determining the number of cord elements desired around the periphery of the tire, cutting the cord fabric on such angle of bias that the cords can be consolidated into a single layer of material at the bead zones of the tire, building up the tire carcass with materially flattened tread of less diameter than the finished tire and side walls in the zone of the beads of substantially normal size and shape, and subsequently shaping the tire carcass by expanding the tread portion thereof.

In testimony whereof I affix my signature.
HAROLD A. DENMIRE.